Oct. 13, 1964 J. A. NAVA ETAL 3,152,850
QUICK DISCONNECT CONNECTOR
Filed May 10, 1962 3 Sheets-Sheet 3

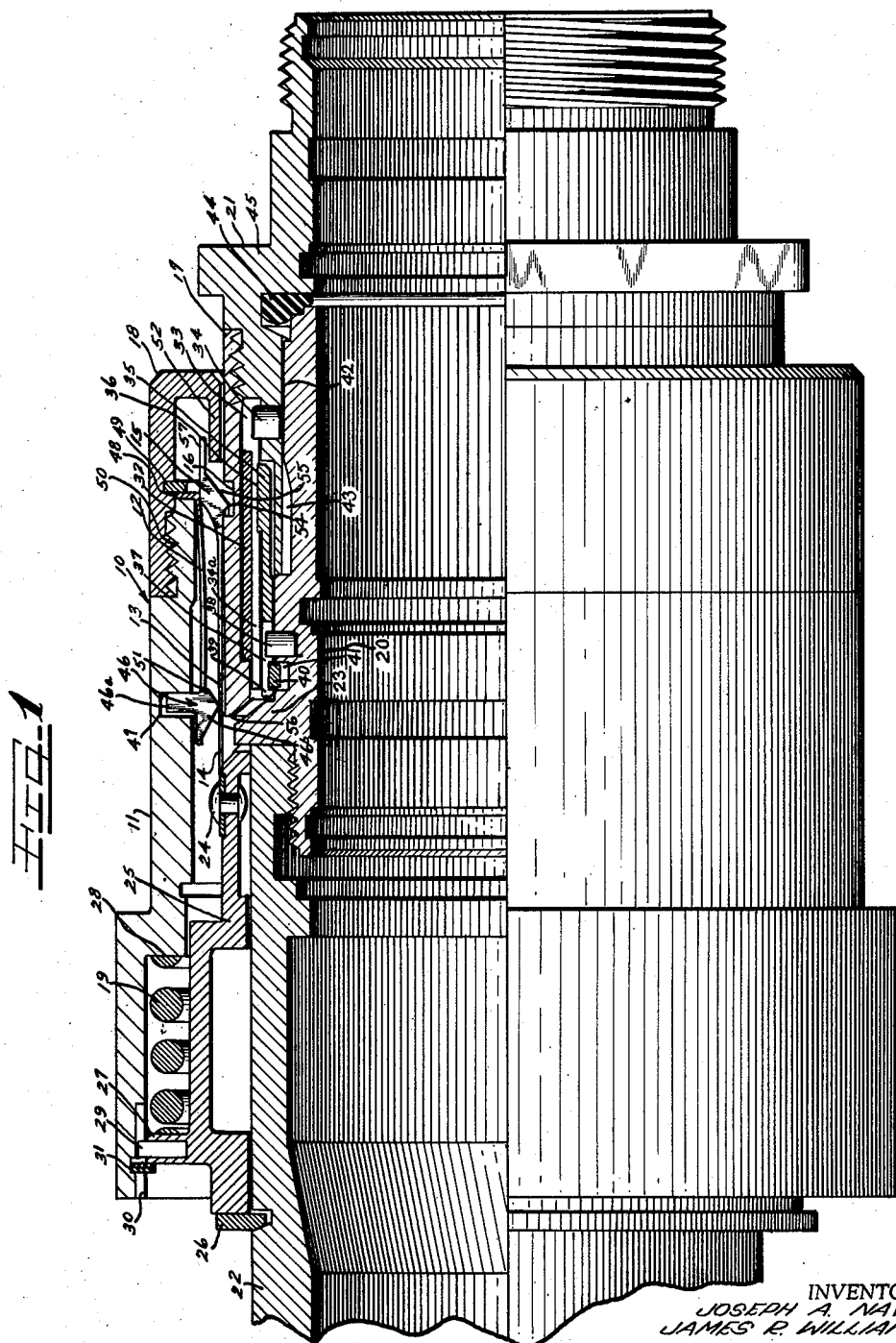

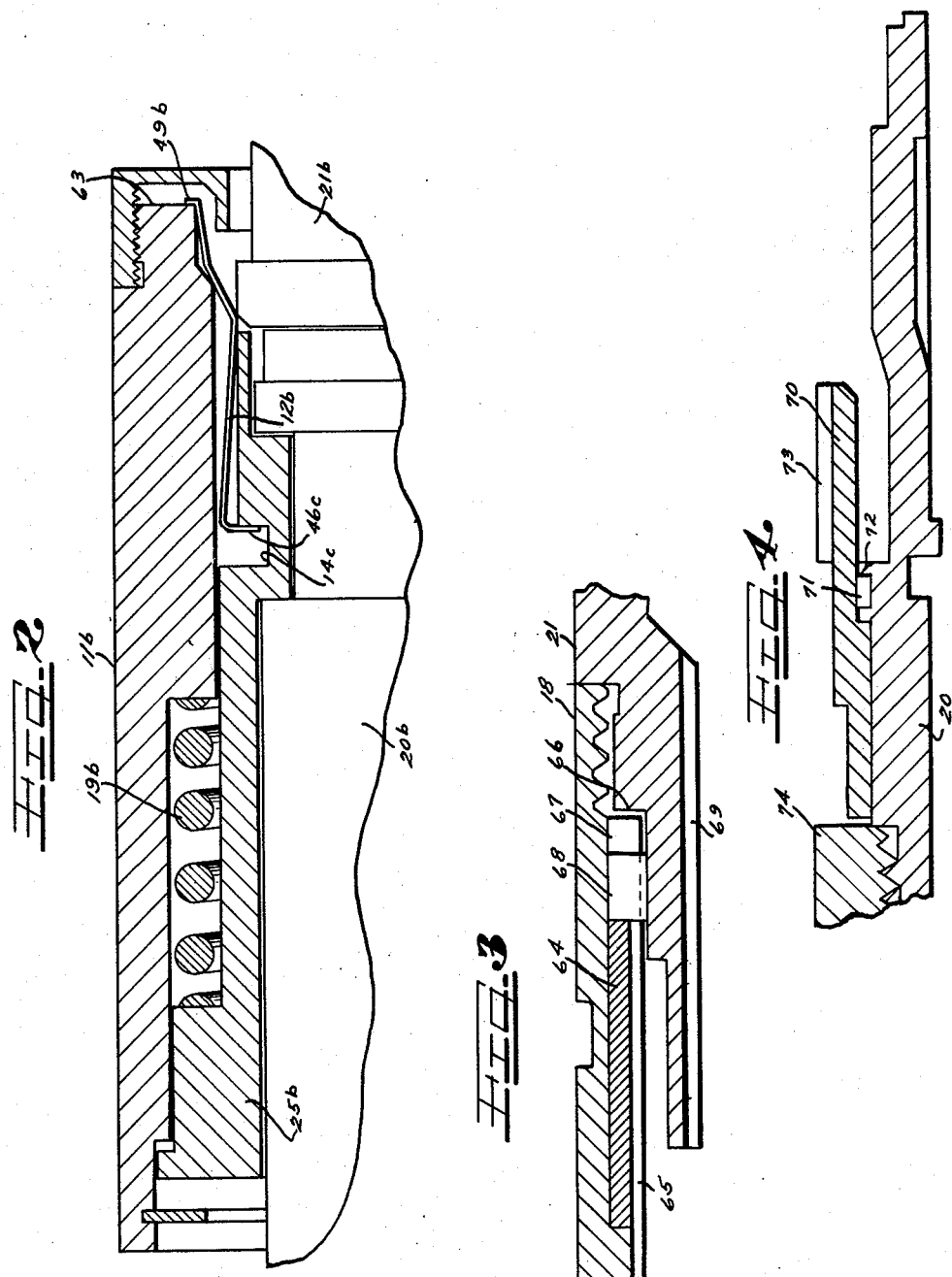

INVENTORS
JOSEPH A. NAVA
JAMES R. WILLIAMS
BY
ATTORNEYS

United States Patent Office 3,152,850
Patented Oct. 13, 1964

3,152,850
QUICK DISCONNECT CONNECTOR
Joseph A. Nava, Villa Park, and James R. Williams, Maywood, Ill., assignors to The Pyle National Company, Chicago, Ill., a corporation of New Jersey
Filed May 10, 1962, Ser. No. 193,713
11 Claims. (Cl. 339—89)

This invention relates to electrical connectors and the like, and more particularly to a quick disconnect assembly which may be used to house electrical or other components in a selectively adjustable orientation.

In accordance with the present invention, a receptacle and plug member are held in locked position by means of a coupling nut which can be retracted against a resilient means which also serves to maintain the locked condition by placing locking tines under shear stress in relation to the receptacle and coupling nut. Means are also provided in accordance with the invention for maintaining the coupling nut in retracted position, which means in one embodiment of the invention may include a tine having a camming element which engages in an opening upon retraction of the coupling nut, and is releasable from the opening when the plug is reinserted into the receptacle.

In conjunction with the tines and detent means described, selector key and keyway means are utilized to provide a desired polarization of the receptacle relative to a receptacle outer ring and of the plug relative to a key ring engageable with the receptacle.

Accordingly, it is an object of the present invention to provide a quick disconnect connector which may be used with electrical components or other elements to maintain a secure locking condition when a coupling nut is in assembled overlying relation to detent or key means therefor, and which permits quick disconnect action upon retraction of the coupling nut.

Another object of the invention is to provide a device as described wherein the coupling nut or similar element is maintained in the retracted position against spring pressure, by detent means or tines.

Another object of the invention is to provide a quick disconnect connector which is durable, dependable, resistant to environmental deteriorating conditions and adapted to "fail safe."

Another object of the invention is to provide a device as described requiring minimal connecting force while affording a positive lock indication with exceptionally secure locking action and high retention force.

Another object of the invention is to provide a device as described which may be disconnected quickly and with low extraction force.

Another object of the invention is to provide a device as described having adaptability to a wide variety of configurations and components.

Other objects and advantages of the invention will be seen as the description proceeds in accordance with the drawings in which:

FIGURE 1 is an elevational view, partly in vertical section and partly broken away, of a quick disconnect assembly according to the present invention;

FIGURE 2 is an enlarged vertical sectional view, partly broken away, of alternate means for retaining the quick disconnect assembly in retracted condition;

FIGURE 3 is an enlarged vertical sectional view, partly broken away, of keying means for a receptacle portion of the assembly;

FIGURE 4 is a vertical sectional view, partly broken away, of keying means for a plug portion of the assembly;

Figure 5:
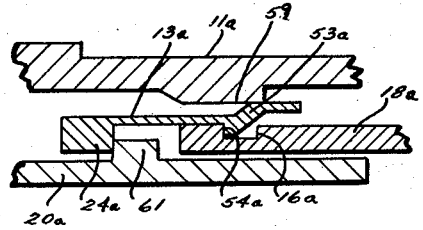
FIGURE 5 is an enlarged vertical sectional view, partly broken away, of a form of locking mechanism in the locked position.

Referring now to the drawings, and to FIGURE 1 in particular, a quick disconnect assembly 10 is shown which may be used for assembling a wide variety of components in a desired orientation or polarization angularly, including electrical connector elements and the like. The assembly 10 employs a peripheral retention principal, with a positive lock. Thus the assembly includes a coupling nut 11, detent tines 12 engageable therewith and locking tines 13 providing cavities 14 for the detent tines 12 as hereinafter set forth. The locking tines have heads 15 engageable in a recess 16 of a locking ring 17, to maintain an assembled condition of the device, with the tines being releasable by engagement therewith of a manually operable ring 18 connected to the coupling nut as the coupling nut is retracted against the force of a spring 19, also as hereinafter further described. Release of the heads 15 of tines 13 permits extraction of a plug shell or plug 20 from a receptacle shell or receptacle 21 to which the locking ring 17 is secured.

It will therefore be seen that the invention provides an interaction of a plurality of components to effect an automatic retention of the coupling nut 11 in the retracted or "rear" direction in the example shown, whereby to provide the capability of mating components which may be used in the assembly at a later stage, and with the device also producing automatic locking of the assembly when such mating occurs.

In the example shown, the assembly 10 includes a housing portion 22 threaded to the plug 20 so as to abut a shoulder 23 thereon. The locking tine ring 13 is secured by rivets 24 to a ring 25 which also can substantially abut the shoulder 23, as retained by a split ring 26 or the like engaged in the housing 22 to afford the assembled relation of the plug 20 hereinabove described.

Further in accordance with the invention, the ring 25 includes a shoulder 27 against which the spring 19 abuts at one end thereof with the other end of the spring abutting a shoulder 28 in the coupling nut 11.

Guided slidable movement of the coupling nut is afforded by a spline 29 received in a guideway 30 in the coupling nut, with the forward movement of the coupling nut being limited by stop rings 31 in the coupling nut. It will thus be seen that the coupling nut can be readily manually retracted against the force of the spring 19 but will automatically release into assembled locking position as hereinafter further described.

In order to provide for a desired polarization of the receptacle 21 with the plug 20, selector key means of multiple construction may be utilized which include a ring 32 having openings 33 therearound for selective engagement with key structures 34 at a desired polarization, and the ring 32 defines keyways 34a for a ring 35 having splines engaging in the keyways as indicated at 36. The ring 35 has end slots or openings 37 for selective engagement with key structures 38 in the plug 20, and the ring 35 may also include a hook 39 engaging a split ring or the like 40 in a plug groove 41, to releasably maintain the ring 35 in position. Also, the plug 20 has splines 42 engageable in guideways 43 in the receptacle 21.

A seal 44 is disposed between the end of the plug 20 and a shoulder 45 on the receptacle, as hereinafter discussed.

Further to describe the quick disconnect action of the embodiment of FIGURE 1, it will be noted that the tines 12 have camming heads 46 which include upper holding lugs 46a receivable in groove 47 of the coupling nut and lower substantially triangular camming portions 46b having forwardly and outwardly inclined edges and rearwardly and outwardly inclined edges. The tines 12 are secured to a ring structure having a radially outwardly turned flange 48 engageable against a ring 49 in the ring 18 and against the end of the coupling nut 11, the ring 18 being threaded at 50 onto the forward end of the coupling nut in the form shown.

In order to provide a holding action, the heads 46 include lower shoulders 51. When the coupling nut 11 is retracted against the spring 19, therefore, the heads 46 move into the openings 14, with the tines 12 preferably being biased radially inwardly, whereby the shoulders 51 engage against the tines 13. Thus this action maintains the retracted position of the coupling nut 11. Simultaneously with the retraction of the coupling nut 11, the ring 18 is moved rearwardly, and so as to effect a release of the plug and receptacle, the ring 18 includes a reversely turned, axially rearwardly extending annular flange 52. Thus, the tines 13 are designed with heads 15 having shoulders 54 engageable in the groove 16 at the rear edge thereof. The heads 15 have upwardly and outwardly inclined edges 55 which act as camming surfaces for the flange 52, whereby the described retraction of the coupling nut is effective to disengage the shoulders 54 of the tines 13 from the locking ring 17. And this disengaged retracted relation is then maintained by the tines 12 and the locking shoulders 51 thereof, as described.

Conversely, when the plug 20 is coupled into the receptacle 21, the locking ring 17 lifts the detent tines 12 out of the slots 14 in the tines 13 by engagement of the rear end 56 of the locking ring with the forwardly inclined edges of the heads 46 on the tines 12.

When the detent tines 12 are lifted out of the slots 14 in the tines 13, the coupling nut 11 is permitted to move forward under the force of the spring 19. This forward movement of the coupling nut is effective to lock the plug 20 to the receptacle 21 by re-engagement of the shoulders 54 of tines 13 in the groove 16, it being noted that the forward end of the coupling nut may cam against upwardly and outwardly curvate edges of the heads 15 of the tines 13 to overcome a preferred radially outward bias of the tines 13.

In the example shown, the flange 49 of the tine structure 12 effects the said camming of the tines 13, but in any event, once the coupling nut 11 is moved forwardly by the spring as described, the coupling nut (or the axially extending portion of the tine ring structure 12) holds an axially extending upper surface of the head 15 downwardly, to maintain the locked position of the tines 13 relative to the lock ring 18.

The head 15 may also have an upper axially forwardly extending end portion 57 overlying the flange 52 but engageable by the flange 52 in the event of any misalignment of the tines 13 to release the said tines.

It will be seen that the invention thus provides a positive lock by placing the reaction members on tines 13 in shear, in locked position. The locked position also maintains a definite compression on the rubber seal 44 between the shells, to maintain a waterproof, moisture-proof and air-leakage-proof condition within the assembly.

Since the tines 13 are preferably biased radially outwardly as noted, when the coupling nut 11 is pulled back manually until it reacts with the plug 20, the lock portions of the tines 13 are uncovered, allowing the tines to disengage from their locked position by means of the spring action built into the tines. Continued pull thus disengages the plug from the receptacle.

It will be seen that because the coupling nut 11 assumes a position in the locked condition thereof directly over the receptacle shoulder, the system is positively locked. And, the tines 13 are stressed in tension when an unwanted uncoupling force is applied to the plug. The lock shoulders on the tines and on the receptacle, as noted, are stressed in shear although in all cases the material can be stressed far below the yield point so that the design is mechanically sound and not susceptible to variations caused by specific applications of the device.

Figure 6:
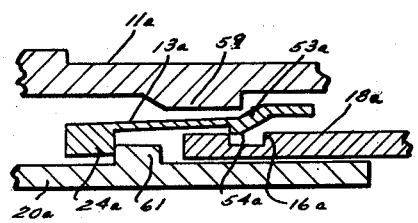
FIGURE 6 is a corresponding view of the structure of FIGURE 5 in release condition.
Figure 8:
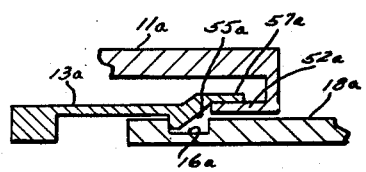
FIGURE 8 is an enlarged vertical sectional fragmentary view showing a coupling nut in proximity to release.

The operation of the connector is represented schematically in the forms shown in FIGURES 5, 6 and 8. Thus, referring to FIGURE 5, the assembly is shown in coupled and locked position with a locking tine 13a having a head 53a maintained in a radially inward position by the coupling nut 11a and the inwardly extending boss portion 59 thereof. A shoulder 54a on the tine 13a engages an opposed shoulder in the groove 16a of the lock ring 18a. Correspondingly, the detent portion or head 24a on the tine 13a engages a shoulder 61 on the plug 20a to maintain the device assembled under shear stress as described.

Referring to FIGURE 6, the assembly is shown in unlocked position as the plug is extracted. Thus movement of the boss 59 of the coupling nut 11a rearwardly permits the head 53a to spring radially outwardly and to disengage the shoulder 54a from the groove 16a.

Figure 7:
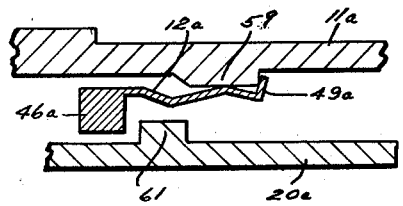
FIGURE 7 is an enlarged vertical sectional view, partly broken away, of an alternate form of means for maintaining the assembly in retracted condition.

In order to provide for plug insertion into the assembly in one motion, detent mechanism is included which is illustrated in alternate form in FIGURE 7, although having a function corresponding to the detent tines 12. This detent mechanism is distinct from the locking mechanism described in FIGURES 5 and 6 and includes a detent tine 12a having a locking head 46a engageable with the shoulder 61 on a plug 20a, or other suitable structure; and having an upstanding end portion 49a engageable with the boss 59 of the coupling nut 11a. Thereby, the coupling nut is securely maintained in the retracted, rear unlocked position thereof.

The entire mechanism is thus designed to withstand shock, vibration, physical abuse, dirt and ice. A "fail-safe" construction is also incorporated in the invention so that, for example, as hereinabove described, and as shown in the structure of FIGURE 8, means are provided to overcome the tendency of the tine 13a to remain in the groove 16a if the tine has lost its radially outward bias. This structure constitutes the outwardly extending flange 57a which is engageable with the ring flange 52a of the manual release ring portion of the coupling nut. Retraction of the coupling nut serves to bring the ring 52a into contact with the camming edge 55a of the tine to positively cam the tine 13a out of its locked position. The ring 52a preferably is continuous throughout and serves to protect the lock tine 13a against damage.

Again, it may be noted that the device is operable even in the event that the tines 12 fail to maintain their tension, for, as seen in respect to FIGURE 7, manual over-ride may be achieved by holding the coupling nut 11a in the rear or retracted position, which will allow proper engagement of the plug 20a in the receptacle. Although this may necessitate using two hands, proper orientation and connection of elements in the assembly 10 can still be accomplished thereby. It may be noted also, in respect to the embodiment of FIGURE 1 for example, that there is very little or no likelihood of loss of tension in the tines 12 particularly in view of the engagement of the lugs 46a in the recess 47.

Figure 9:
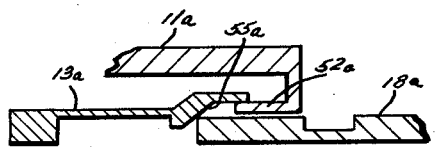
FIGURE 9 is a view corresponding to FIGURE 8 showing the action of the receptacle in raising the locking tine during insertion of the plug, and the protection afforded by the coupling nut for the tine.

As seen in FIGURE 9, it is conceivable that the lock tine 13a could lose its tension or be damaged so that it would be inward from its normal position. As a consequence, it is possible that interference with the receptacle could result which might double back the tine or force it into an insert. In either event, entry of the plug into the receptacle would be prevented.

The manual release ring 52a as previously described will prevent the tine from closing out of design position, and in addition the lead angle on the front end of the tine, indicated at 55a is in camming relation to the leading edge of the ring 52a. Further insertion of the plug, therefore, will cause the lock tines to open, thereby eliminating any impedance, as may be seen in the said FIGURE 9.

Reference to FIGURE 2 will give a clear indication of the operation of an alternate detent 12b corresponding to the detent 12a, for maintaining the coupling nut in the retracted position. Thus, in this form, the coupling nut 11b has an inner shoulder 63 engaged by the upwardly turned flange 49b of the said detent. Correspondingly, the rear end of the detent 12b has a downwardly extending portion 46c engaging in an opening or groove 14c and against the opposed wall thereof so that the detent holds the coupling nut under shear stress. Relative forward movement of the plug 20b toward receptacle 21b and against spring 19b as retained by ring 25b will thus cam the downwardly turned portion of detent 12b in a manner which will move the end 49b out of engagement with the end 63 of the coupling nut and release the coupling nut.

Referring now to FIGURE 3, a plurality of polarization positions or positions of angular orientation may be generated within the scope of the present invention by using, for example, two shell keys for reference, and rotating keys and auxiliary rings so that the relation between the shell keys and the auxiliary keys may be varied. The hardware key selection can be performed at the assembly stage, and unauthorized field changes are thus inhibited or prevented in accordance with the invention.

In the receptacle, the auxiliary key may be contained in an internal ring 64, with the end of the ring presented to the plug (not shown in this figure) having, for example, three keyways 65. The end of the ring facing the receptacle flange 66 of the receptacle 21 may have, for example, sixteen slots 67. Any one of the slots 67 may thus be selectively engaged with the receptacle selector key 68. The main shell keyways are indicated at 69 and correspond to the keyways or guideways 43 in FIGURE 1.

Selection of an alternate key position is made by engaging the desired slot 67 with the receptacle key selector 68 and threading the outer ring 18 into position, to secure the auxiliary keyway ring 64. A sprag ring (not shown) may be interposed between the outer ring 18 and the receptacle body 21 to prevent seal disassembly.

Referring now to FIGURE 4, it will be seen that in the plug 20, the auxiliary key ring 70 (generally corresponding to the ring 35 of FIGURE 1) is interposed between the plug shell 20 and the coupling nut (not shown). The ring 70 contains the plug selector key 71, and the plug shoulder 72 contains a plurality of slots, as for example sixteen slots, any one of which may be engaged with the plug selector key 71. It will be seen that a spline or the like 73 is provided which can fit into a keyway such as indicated at 65 in FIGURE 3.

In FIGURE 4, the element 74 threaded on the plug 20 corresponds to a cable adaptor although other suitable structure is, of course, encompassed within the scope of the invention.

Selection of an alternate key position in accordance with FIGURE 4 is made by engaging the plug selector key 71 into the desired alternate position slot in the shoulder 72 of the plug and then setting, for example, the cable adapter 74 onto the plug shell whereby to secure the auxiliary key ring 70. Field alteration of the key position is therefore not possible without disassembling the key adapter from the plug shell.

There has thus been provided a quick disconnect assembly which affords reliable retraction of the coupling nut as held in retracted position by detent tine means therefor, to permit ready withdrawal of the plug from the receptacle, or polarization of the plug relative to the receptacle, so that connector components or the like can be oriented in a desired angular relation. Further, the device of the invention provides automatic locking of the coupling nut when the plug is reinserted into the receptacle with a consequent shear stress engagement of locking tine means as held by the coupling nut in its forward or assembled position. It will be appreciated, therefore, that the desired orientation of plug and receptacle is securely maintained. And advantages such as tamper-proof construction as heerinabove described, fail-safe construction, and ready assembly and disassembly even by unskilled personnel, are also inherent in the invention so that a wide range of applications is afforded in addition to the electrical connector applications for which the device is singularly well adapted.

Although we have herein set forth and described our invention with respect to certain specific principles and details thereof, it will be understood by those skilled in the art that these may be varied without departing from the spirit and scope of the invention as set forth in the hereunto appended claims.

We claim as our invention:

1. A quick disconnect assembly for electrical connectors or the like comprising,
   a receptacle,
   a plug releasably engaged in the receptacle,
   a coupling nut,
   a detent having one end secured by the coupling nut and the other end substantially free,
   said other end including a head having a lug and said coupling nut having a recess receiving the lug,
   a ring,
   said plug having shell means surrounded by the ring,
   and said coupling nut having resilient means between the ring and said coupling nut urging the coupling nut in one direction,
   a tine structure including a tine biased outwardly and having a shoulder,
   said receptacle carrying a ring forming a groove releasably engaging said shoulder,
   said coupling nut carrying an internal annular ring and said tine having a cam edge engageable by the internal annular ring upon retraction of the coupling nut,
   said tine structure including an opening,
   said head engaging in said opening upon retraction of the coupling nut against said resilient means,
   said head including a shoulder engaging the tine structure,
   and said head having cam surfaces engaged by said ring carried by said receptacle when said plug is inserted into said receptacle to move the detent outwardly of the opening in the tine structure and to permit the coupling nut to move from retracted position to assembled position in the direction urged by said resilient means.

2. The device according to claim 1 wherein said coupling nut is configured to maintain said tine structure in locking position relative to the ring on the receptacle in the assembled position of the coupling nut and to release the tine structure upon retraction of the coupling nut,
   said tine structure having the tine thereof biased radially outwardly so that release thereof from locking position is automatic upon retraction of the coupling.

3. The device according to claim 2 wherein said receptacle has a ring defining selector openings therearound and said receptacle carries a key selector for selective engagement in said openings.

4. The device according to claim 3 wherein the plug carries an auxiliary ring having a spline engageable in a keyway in the ring for the receptacle,
   and defining a plurality of openings therearound,
   said plug carrying a key selector selectively engageable in the openings of the auxiliary key selector ring, whereby the plug and receptacle may be aligned in a desired angular polarization and the device may be readily connected and disconnected in the desired polarization for the receptacle and plug.

5. A connector comprising
separable plug and receptacle parts,
a coupling nut on one of said parts,
continuous biasing means loading said coupling nut in one axial direction,
detent tine means connected to said coupling nut and preloaded radially inwardly,
locking tine means preloaded radially inwardly and connected to said one part and projecting axially thereof,
    the other of said parts having a recess in the peripheral surface thereof for receiving said locking tine means,
    said locking tine means having an opening formed therein for receiving said detent tine means when said coupling nut is retracted against said continuous biasing means,
    said coupling nut and said locking tine means having interengaging cam portions for lifting and releasing said locking tine means radially outwardly out of said peripheral recess upon retraction of said coupling nut.

6. A connector as defined in claim 5, said coupling nut being recessed and said detent tine means having a lug received in said recessed portion to guide and protect the detent tine means in its movement.

7. A connector as defined in claim 5, said detent tine means having lower substantially triangular camming portions providing forwardly and rearwardly inclined edges affording guided entrance into and out of said opening in said locking tine means.

8. A connector as defined in claim 7, said detent tine means including a shoulder at the base of one of said camming portions to engage the edge of said opening in said locking tine means, thereby to hold said coupling nut in retracted position.

9. A connector as defined in claim 8, said coupling nut having a reversely turned axially rearwardly extending flange engageable with said edge on said head of said locking tine means and comprising said cam portions.

10. A connector as defined in claim 5, said locking tine means having a head at the free end thereof formed with an upwardly and outwardly inclined edge comprising said cam portions.

11. A connector as defined in claim 10, said coupling nut having a reversely turned axially rearwardly extending flange engageable with said edge and said head of said locking tine means and comprising said cam portions.

References Cited in the file of this patent
UNITED STATES PATENTS

| | | |
|---|---|---|
| 2,485,763 | Moon | Oct. 25, 1949 |
| 2,565,572 | Pangborn | Aug. 28, 1951 |
| 2,933,712 | Klopfenstein | Apr. 19, 1960 |
| 2,983,893 | Jackson | May 9, 1961 |
| 3,017,603 | Bac | Jan. 16, 1962 |
| 3,051,925 | Felts | Aug. 28, 1962 |
| 3,077,330 | Lamphear | Feb. 12, 1962 |
| 3,096,135 | Feustel et al. | July 2, 1963 |